3,573,205
DIISOCYANATE MODIFIED POLYISOBUTENYLSUCCINIMIDES AS LUBRICATING OIL DETERGENTS

Warren Lowe and Yngve G. Hendrickson, El Cerrito, Calif., assignors to Chevron Research Company, San Francisco, Calif.
No Drawing. Filed Dec. 17, 1968, Ser. No. 784,463
Int. Cl. C10m 1/32
U.S. Cl. 252—51.5                4 Claims

ABSTRACT OF THE DISCLOSURE

The reaction product of mono- and bis-succinimides of alkylene polyamines and diisocyanates are used as detergents in lubricating oils.

BACKGROUND OF THE INVENTION

Field of the invention

The modern lubricating oil contains detergents and dispersants to prevent the formation of deposits and the depositing of sludge in internal combustion engines. To be an acceptable detergent, not only must the additive have good detersive capability, but its decomposition products must not enhance the formation of deposits.

Description of the prior art

For a long time most detergents employed in lubricating oils for internal combustion engines contained inorganic salts which resulted in the deposition of ash. With the advent of acylated amines, particularly, polyisobutenyl succinimides of alkylene polyamines, ashless detergents were provided having good performance in dispersing and deterging deposit-forming materials. Various succinimides as illustrated in U.S. Pats. Nos. 3,024,237, 3,202,678, 3,219,666, and 3,275,554.

While these patents provided a broad range of varying acylated amine compositions, they also opened a new field for modification and variation of the various materials disclosed. Minor variations were found to enhance performance in particular situations.

SUMMARY OF THE INVENTION

Modified polyisobutenyl succinimides of alkylene polyamines are provided, wherein the succinimides are modified with diisocyanates to introduce urea functionalities and provide relatively high molecular weight compounds. The polyisobutenyl groups are of from about 400 to 2,500 molecular weight, the alkylene polyamines have at least 3 amine nitrogens and preferably from 4 to 6 amine nitrogens, and may be bonded to from 1 to 2 polyisobutenyl succinoyl groups.

DESCRIPTION OF THE PREFERRED EMBODIMENTS

The compositions of this invention are the reaction products of polyisobutenyl succinic anhydride and an alkylene polyamine of from 3 to 6 amino nitrogens under conditions resulting in the elimination of water, followed by reaction of the product with a diisocyanate to form diurea bridges between 2 molecules of the initial reaction product. The mole ratio of anhydride to polyamine is in the range of about 0.9 to 2.1 to 1, while the diisocyanate to initial reaction product mole ratio is about 0.5 to 1.

As a shorthand concept to what the average composition of the product is and its major constituent, the following formula is provided:

wherein Y is polyisobutenylsuccinimidyl, the polyisobutenyl group having an average molecular weight in the range of about 400 to 2,500; $Y^1$ is the same as Y or amino; U is alkylene of from 2 to 3 carbon atoms, there being at least 2 carbon atoms between the nitrogen atoms; X is an aliphatically saturated hydrocarbon residue of from 1 to 12 carbon atoms; and $m$ and $n$ are integers having a sum of from 0 to 3.

When referring to $Y^1$ as the same as Y, it is intended only that a polyisobutenylsuccinimidyl group be meant, not that the polyisobutenyl groups be necessarily the same.

Preferred compositions have the sum of $m$ and $n$ in the range of 1 to 2 and the polyisobutenyl group having an average molecular weight in the range of about 750 to 1,500.

The group indicated by X is hydrocarbylene and may be aliphatic, alicyclic, or aromatic, preferably aromatic of from 6 to 12 carbon atoms, more usually of from 6 to 10 carbon atoms. Illustrative groups are butylene, hexylene, phenylene, tolylene, isopropylphenylene, cyclohexylene, etc.

The compositions of this invention are first prepared by combining a polyisobutenyl succinic anhydride and an alkylene polyamine. The polyisobutenyl succinic anhydride will have the following formula.

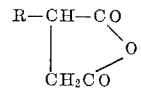

wherein R is a polyisobutylene group of from 400 to 2,500 molecular weight, more usually of from 750 to 1,500 molecular weight.

The alkylene polyamine will have the following formula:

wherein U is alkylene of from 2 to 3 carbon atoms (the same as previously defined by and $l$ is an integer of from 2 to 5.

The alkylene polyamine compositions are, for the most part, not individual compounds, but rather compositions having an average composition with 1 or 2 individual compounds in major proportions.

While aminoalkyl piperazines are not included in the formula, such compositions are normal concomitants in the commercial preparation of polyethylene polyamines. The piperazines are approximately equivalent to the alkylene polyamines in performance and are included in the definition of ethylene polyamines. The piperazines have the following formula:

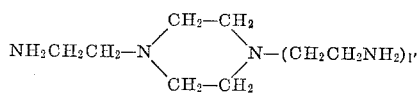

wherein $l'$ is an integer of from 0 to 1.

As already indicated, the polyisobutenyl succinimides of alkylene polyamines are old compounds and have been repeatedly reported and prepared in various patents. Therefore, the description to their preparation will be relatively brief.

The alkylene polyamine and polyisobutenyl succinic anhydride are combined in the appropriate proportions either neat or preferably in an inert hydrocarbonaceous solvent. The reaction mixture is then heated at a temperature above the boiling point of water, more usually in the range of about 125° C. to 200° C., preferably in the range of about 135° C. to 175° C. When the reaction has been carried out for a sufficient time, usually in the range of ½ hour to 6 hours, heating is stopped and the reaction mixture allowed to cool.

In those instances where bis-succinimides are prepared and the polyisobutenyl groups are different, it is frequently desirable to add one polyisobutenyl succinic anhydride and carry out the reaction as to that succinic anhydride, followed by the addition of the second polyisobutenyl succinic anhydride. However, both polyisobutenyl succinic anhydrides may be added initially or during the course of the reaction or stepwise.

When the succinimide formation is completed, the reaction with the diisocyanate is then carried out. This is simply done by adding diisocyanate, either neat or in a solvent, to the succinimide reaction mixture and heating for a sufficient time at a temperature in the range of about 75° to 150° C. Ordinarily, the reaction time will be in the range of about 0.5 hour to 6 hours. The reaction may be carried out neat or in an inert solvent, preferably the same solvent used for the succinimide formation.

After the end of the reaction, the reaction mixture may be used directly as a lubricating oil additive. If desired, some purification may be carried out, such as solvent extraction, treatment with adsorbents, chromatography, etc. The reaction mixture may be stripped in vacuo to remove any unreacted diisocyanate or other volatile materials which may be present.

EXAMPLES

The following examples are offered by way of illustration and not by way of limitation.

EXEMPLARY PREPARATIONS OF ALKYLENE POLYAMINE SUCCINIMIDES

Example A

To a reactor was charged 1,400 gal. (at 200° F.) of a 40 weight percent solution of polyisobutenyl-succinic anhydride (polyisobutenyl of about 1,000 average molecular weight) in neutral oil, followed by the addition of 2 oz. of defoamer. Nitrogen flow was then begun through the oil solution and 310 lbs. of triethylene tetramine (average composition) added. The reaction mixture was then heated to 310°–320° F. and the temperature held for 2 hours. At the end of this time, the heating was stopped.

Example B

Following the procedure described above, 1,385 gals. (at 200° F.) of a 40 weight percent solution of polyisobutenylsuccinic anhydride (polyisobutenyl of about 1,000 average molecular weight) was charged to a reactor, 2 oz. of defoamer added, and nitrogen flow begun through the oil solution. To the mixture was then added 638 lbs. of tetraethylene pentamine (average composition) and the mixture heated to 310°–320° F. and maintained at that temperature for 2 hours. At the end of this time, the heating was stopped.

Example I

Into a reaction vessel was charged 1,020 gm. of a composition according to Example A (percent N, 1.10), the mixture heated with stirring to 125° F. and 17.4 gm. of toluene diisocyanate (80%–2,4; 20%–2,6) added. The temperature was then raised to 225° F. and maintained for 8 hours. At the end of this time, a vacuum was applied and the solution stripped at 275° F.

Example II

Into a reaction vessel was charged 1,076 gm. of a 40 weight percent solution of bis polyisobutenyl succinimide of tetraethylene pentamine (0.45 mole of tetraethylene pentamine [average composition] prepared by first combining the tetraethylene pentamine with 0.5 mole of polyisobutenyl succinic anhydride [polyisobutenyl of approximately 1,000 average molecular weight] followed by the addition of 0.5 mole of polyisobutenyl succinic anhydride [polyisobutenyl of about 640 average molecular weight] [percent N, 1.30]) and the solution heated with stirring to 150° F.

To the mixture was then slowly added 17.6 gm. of toluene diisocyanate (Nacconate 80) (80%–2,4; 20%–2,6). When the addition was completed, the mixture was heated and stirred at 200° F. for 8 hours. At the end of this time, a mild vacuum was applied and the product stripped at 250° F. The residue weighed 1,091 gm.

Example III

Into a reaction vessel was charged 984 g. of polyisobutenyl succinimide prepared as described in Example B and heated with stirring to 150° F. To this mixture was slowly added 34.9 g. of Nacconate 80 and the mixture was then stirred at 150°–200° F. for 3 hours.

Example IV

Into a reaction vessel fitted with stirrer, nitrogen inlet, and reflux condenser was charged 100 g. of a 40 weight percent oil solution of polyisobutylene succinimide of tetraethylene pentamine (polyisobutenyl group of about 1,000 molecular weight) and the mixture heated at 230° F. for about 1 hour. At the end of this time, the mixture was allowed to cool to 140° F., while maintaining a nitrogen atmosphere and 100 ml. of mixed hexanes added with agitation.

To the solution was then added 5.95 g. (0.034 mole) of toluene diisocyanate (80%–2,4; 20%–2,6) in 100 ml. of mixed hexanes and the mixture stirred at room temperature for 64 hours. At the end of this time, there was still unreacted diisocyanate. The mixture was then refluxed for 4 hours, and a further addition of mixed hexanes made and refluxing continued for an additional 5 hours. The hexane was removed by vaporization and the residue weighed 130.3 g.

A 109.5 g. aliquot of the reaction mixture was dissolved in 150 g. of 130 neutral oil and the oil solution heated in vacuo up to a temperature of 150° C. The final oil solution weighed 237.7 g. This product was filtered at 110° C. through diatomaceous earth.

A 8.84 g. sample of the above solution was dissolved in 41.52 g. of neutral oil giving a 5.6 weight percent cencentration of active material. The oil solution had a viscosity at 100° F. of 179.8 SSU and at 210° F. of 46.6 SSU.

Example V

Into a reaction vessel as described in Example IV was charged 100 g. of the same oil solution of the succinimide described in Example IV and the solution heated at 230° F. for 2 hours. After allowing the solution to cool to 100° F. in a nitrogen atmosphere, 100 ml. of mixed hexanes was added, followed by the addition of a solution of 5.32 g. (0.032 mole) of hexamethylene diisocyanate in 100 ml. of mixed hexanes. The mixture was stirred under nitrogen for 19 hours. Volatile materials were then stripped in vacuo, the temperature being raised to 130° C. The residue weighed 104.8 g. A 2.8 g. sample was diluted to a total weight of 50 g. with 130 neutral oil giving a 5.6 weight percent concentration. Viscosity at 100° F.=162 SSU; at 210° F.=44.96 SSU.

Example VI

Following the procedure of Example V, 1,202 g. (0.397 mole) of a 40 weight percent solution of polyisobutenylsuccinimide of tetraethylene pentamine (polyisobutenyl of about 1,000 molecular weight; percent N, 2.32) was diluted with 1.2 liters of mixed hexanes. To the solution was then added 66.7 g. (0.397 mole) of hexamethylene diisocyanate and the reaction mixture stirred at room temperature for 16 hours. Volatile material was then stripped in vacuo, raising the temperature to a final temperature of 130° C. The residue weighed 1,254 g.

*Analysis.*—Percent N, 3.11, 3.11; percent basic N, 0.50, 0.51.

A 2,8 g. sample was diluted to 50 g. with 130 neutral oil giving a 5.6 weight percent concentration which had a viscosity at 100° F. of 156.8 SUS and at 210° F. of 44.40 SUS.

Example VII

Into a reaction vessel was charged 1,000 g. (0.342 mole) of a 40 weight percent solution of polyisobutenyl succinimide of diethylene tetramine (polyisobutylene of about 640 molecular weight; percent N, 1.90, 1.93; percent basic N, 1.04, 1.00) and heated at 330° F. for 2 hours. The mixture was allowed to cool to 90° F. under nitrogen, then diluted with 1 liter of mixed hexanes.

To the solution was then added 59.9 g. (0.34 mole) of toluene diisocyanate (80%–2,4; 20%–2,6) in 0.5 liter of mixed hexanes. The reaction mixture was stirred at room temperature under nitrogen for 16 hours, followed by the dilution with 750 ml. of mixed hexanes. The mixture was then heated to reflux for 7 hours, further diluted with 500 ml. of mixed hexanes and then stirred at room temperature for 24 hours.

Since diisocyanate was still present in the reaction solution, the solution was further diluted with 600 ml. of mixed hexanes and allowed to stand for 9 days. After further dilution with mixed hexanes, the solution was refluxed for 4 hours under nitrogen and then allowed to stand at room temperature with agitation for 40 hours, followed by further refluxing for 7 hours and further agitation at room temperature for 16 hours. The refluxing and agitation at room temperature was repeated but there still remained residual isocyanate.

A 522.5 g. aliquot was diluted with 600 ml. of xylene and the mixture refluxed at 120°–130° C. for 20 hours under nitrogen.

The major portion of the original reaction mixture was diluted with 1 liter of xylene and solvent distilled over until the overhead temperature was 95° C. An additional 1 liter of xylene was then added and the solution refluxed under nitrogen at 120°–130° C. for 17 hours.

The 2 solutions were then combined and the xylene stripped at atmospheric pressure, followed by applying a mild vacuum. Since there appeared to be a significant amount of xylene remaining, the residue was diluted with 875 g. of 130 neutral oil and then stripped at atmospheric pressure under nitrogen to a temperature of 160° C. and then the pressure slowly reduced.

The residue was then heated to 160° C. while the pressure was reduced to 8–9 mm. Hg and the temperature and vacuum held for 0.5 hour. The product was calculated to have about 55 weight percent of active material.

Example VIII

Into a reaction vessel as described previously was charged 500 g. (0.11 mole) of a 40 weight percent oil solution of bis (polyisobutenylsuccinimide) of tetraethylene pentamine (polyisobutenyl of about 640 average molecular weight; percent N, 1.48, 1.47; percent basic N, 0.65, 0.68) and the solution heated at 330° F. for 2 hours. After allowing the solution to cool to 100° F., 0.5 liter of mixed hexanes was added, followed by the addition of 18.35 g. (0.11 mole) of toluene diisocyanate (as previously described) in 250 ml. of mixed hexanes. The solution was stirred at room temperature for 18 hours under nitrogen, followed by refluxing the solution for 6 hours. After stirring at room temperature under a nitrogen stream for another 18 hours, most of the hexane had evaporated. To the solution was then added 875 g. of 130 neutral oil and the solution stripped of hexanes in vacuo, raising the temperature to 150° C., holding the final temperature for ½ hour at a vacuum of 6–8 mm. The residue weighed 1,388 g.

*Analysis.*—Percent N, 0.73, 0.75; percent basic N, 0.09, 0.10.

Example IX

Into a reaction vessel fitted with a stirrer, nitrogen inlet and turned down condenser was charged 1,202 gm. (0.397 m.) of polyisobutenyl succinimide of tetraethylene pentamine (percent N, 2.32) as a 40 weight percent solution in oil and heated at 330° F. under nitrogen for 2 hours. The heating was stopped, the mixture allowed to cool, 1.2 l. of mixed hexanes added, followed by the addition of a solution of 69 gm. (0.397 m.) of toluene diisocyanate (as previously described) in one l. of mixed hexanes through an equilibrated dropping funnel, the condenser having now been turned up.

When the addition was completed, the mixture was stirred for a period of 44 hours, then the condenser turned down and about one l. of hexane stripped off, the temperature being raised to 75° C. To the remaining solution was added 2,151 gm. of 130 neutral oil and the hexane stripping continued in vacuo the temperature being raised to 145° C. The last traces of hexane were removed by heating the solution to 150° C. and lowering the pressure to 10 to 13 mm. Hg and maintaining these conditions for ½ hour. The residue oil was then analyzed, percent N, 1.19, 1.17 (16 weight percent active).

The compositions of this invention may be formulated with various lubricating fluids (hereinafter referred to as oils) which are either derived from natural or synthetic sources. Oils generally have viscosities of from about 35 to 50,000 Saybolt Universal Seconds (SUS) at 100° F. Among natural hydrocarbonaceous oils are paraffin base, naphthenic base, asphaltic base and mixed base oils. Illustrative of synthetic oils are: hydrocarbon oils such as polymer of various olefins, generally of from 2 to 8 carbon atoms, and alkylated aromatic hydrocarbons; and non-hydrocarbon oils, such as polyalkylene oxide, aromatic ethers, carboxylate esters, phosphate esters, and silicon esters. The preferred media are the hydrocarbonaceous media, both natural and synthetic.

The above oils may be used individually or together whenever miscible or made so by the use of mutual solvents.

When the detergents of this invention are compounded with lubricating oils for use in an engine, the detergents will be present in at least about 0.1 weight percent and usually not more than 20 weight percent, more usually in the range of about 1 to 10 weight percent. The compounds can be prepared as concentrates due to their excellent compatibility with oils. As concentrates, the compounds of this invention will generally range from about 10 to 70 weight percent, more usually from about 20 to 50 weight percent of the total composition.

A preferred aspect in using the compounds of this invention in lubricating oils is to include in the oil from about 1 to 50 mM./kg. of a dihydrocarbyl phosphorodithioate, wherein the hydrocarbyl groups are from about 4 to 36 carbon atoms. Usually, the hydrocarbyl groups will be alkyl or alkaryl groups. The remaining valence of the phosphorodithioate will usually be satisfied by zinc, but polyalkyleneoxy or a third hydrocarbyl group may also be used. (Hydrocarbyl is an organic radical composed solely of carbon and hydrogen which may be aliphatic, alicyclic, or aromatic.)

Other additives may also be included in the oil such as pour point depressants, oiliness agents, antioxidants, rust inhibitors, etc. Usually, the total amount of these additives will range from about 0.1 to 10 weight percent, more usually from about 0.5 to 5 weight percent. The individual additives may vary from about 0.01 to 5 weight percent of the composition.

In order to demonstrate the excellent effectiveness of the compounds of this invention as detergents and dispersants in lubricating oils, a number of the compounds were tested in a 1-G Caterpillar test (MIL-L-45199 conditions). The oil used was a Mid-Continent SAE 30 oil and 12 mM./kg. of zinc di(alkylphenyl) phosphorodithioate (the alkyl groups were polypropylene of about 12 to 15 carbon atoms) was included. The following table indicates the particular derivatives used, the amount used, the time for which the run was carried out and the results. Also included for comparison are the results for the base oil containing only the phosphorodithioate. The rating of groove deposits is based on a range of 0 to 100, 100 being completely filled grooves. The rating for land deposits is based on a range of 0 to 800, 800 being completely black.

TABLE I

| Additive | Weight percent [1] | Hours | Grooves | Lands |
|---|---|---|---|---|
| Example IX | 6.2 | 120 | 50-7.4-0.6-0.2 | 270-20-10 |
| Example IX | 8.7 | 120 | 85-6.2-0.6-0.5 | 175-20-15 |
| Example VI | 3.3 | 120 | 77-6.9-0.5-0.2 | 130-5-5 |
| Succinimide [2] | 3.5 | 120 | 52-8.3-0.4-0.3 | 455-10-15 |
| Base oil [3] | | 60 | 93-15-5-3 | 500-800-370 |

[1] The weight percent reported is for the oil solution as prepared in the example indicated. Except for the first result, the amounts are based on equal succinimide; the first result is based on equal nitrogen to the succinimide reference.
[2] The mono(polyisobutenylsuccinimide) of tetraethylene pentamine (polyisobutenyl of approximately 1,000 average molecular weight) as a 40 weight percent oil solution.
[3] Base oil with 12 mm./kg. zinc di(alkylphenyl) phosphorodithioate as described.

It is evident from the above results that despite the fact they have substantially little basic nitrogen, the compositions provide effective detergency and dispersancy under the extremely severe temprature conditions of the diesel engine. Furthermore, th compositions are compatible with other additives normally found in compounded lubricating oils.

We claim:

1. A lubricating oil composition having in an amount sufficient to provide detergency and dispersancy the reaction product of a diisocyanate, and a second reaction product, the diisocyanate having a hydrocarbylene group of from 1 to 12 carbon atoms, wherein the reaction temperature in the formation of said reaction product is in the range of 75° to 150° C., the reaction time is in the range of about 0.5 to 6 hours, and the mole ratio of diisocyanate to second reaction product is about 0.5 to 1, wherein said second reaction product is in the reaction product of a polyisobutenyl succinic acid producing group and an alkylene polyamine of from 3 to 6 amino nitrogen atoms, reacted at a temperature in the range of 125° to 200° C., wherein said polyisobutenyl group has an average molecular weight of from 400 to 2,500 and said alkylene polyamine has alkylene groups of from 2 to 3 carbon atoms, there being at least 2 carbon atoms between the nitrogen atoms, and wherein the mole ratio of polyisobutenyl succinic acid producing group to alkylene polyamine is 0.9–2.1:1.

2. A lubricating oil composition according to claim 1, wherein said diisocyanate is toluene diisocyanate and said alkylene polyamine is tetraethylene pentamine.

3. A lubricating oil composition according to claim 1, wherein said diisocyanate is an alkylene diisocyanate of from 1 to 12 carbon atoms.

4. A lubricating oil composition according to claim 3, wherein said diisocyanate is hexamethylene diisocyanate.

References Cited
UNITED STATES PATENTS

| | | | |
|---|---|---|---|
| 3,219,666 | 11/1965 | Norman et al. | 252—51.5A |
| 3,340,190 | 9/1967 | Deluga et al. | 252—51.5A |
| 3,385,791 | 5/1968 | Colyer et al. | 252—51.5A |

DANIEL E. WYMAN, Primary Examiner

W. J. SHINE, Assistant Examiner